( 12 ) United States Patent
Rao

(10) Patent No.: US 12,056,460 B2
(45) Date of Patent: Aug. 6, 2024

(54) DADDA ARCHITECTURE THAT SCALES WITH INCREASING OPERAND SIZE

(71) Applicant: International Business Machines Corporation, Armonk, NY (US)

(72) Inventor: Rajat Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 17/315,659

(22) Filed: May 10, 2021

(65) Prior Publication Data

US 2022/0357921 A1 Nov. 10, 2022

(51) Int. Cl.
*G06F 7/53* (2006.01)

(52) U.S. Cl.
CPC .................. *G06F 7/5318* (2013.01)

(58) Field of Classification Search
CPC .............................. G06F 7/52–5338
See application file for complete search history.

(56) References Cited

U.S. PATENT DOCUMENTS

| 6,490,608 | B1 | 12/2002 | Zhu | |
|---|---|---|---|---|
| 10,725,741 | B2 * | 7/2020 | Clark | G06F 7/5443 |
| 2011/0264719 | A1 * | 10/2011 | Mortensen | G06F 7/4824 |
| | | | | 708/204 |
| 2018/0088905 | A1 | 3/2018 | Klein et al. | |
| 2021/0096818 | A1 * | 4/2021 | Huang | G06F 7/5443 |

FOREIGN PATENT DOCUMENTS

EP 1746494 A1 1/2007

OTHER PUBLICATIONS

A. Cilardo et al., "High Speed Speculative Multipliers Based on Speculative Carry-Save Tree," Dec. 2014, in IEEE Transactions on Circuits and Systems I: Regular Papers, vol. 61, No. 12, pp. 3426-3435. (Year: 2014).*
M. V. Praveen Kumar, S. Sivanantham, S. Balamurugan and P. S. Mallick, "Low power reconfigurable multiplier with reordering of partial products," 2011, 2011 International Conference on Signal Processing, Communication, Computing and Networking Technologies, Thuckalay, India, pp. 532-536. (Year: 2011).*

(Continued)

*Primary Examiner* — Jyoti Mehta
*Assistant Examiner* — Vivian Diem Ha Ledynh
(74) *Attorney, Agent, or Firm* — Cantor Colburn LLP; Edward Wixted

(57) ABSTRACT

Aspects of the invention include physical design-optimal Dadda architectures that scale with increasing operand size. Partial product arrays can be generated for two n-bit operands and columns in the partial product arrays can be shifted to a first row. The number of partial products in each column can be iteratively reduced across one or more stages until each column has at most two partial products. At each stage a maximum column height is determined and each column having a height greater than the maximum column height is reduced using half-adders and full-adders. Result bits of the half-adders and the full-adders are placed at the bottom of the current column and carry bits of the half-adders and the full-adders are placed at the bottom of the next column.

7 Claims, 6 Drawing Sheets

(56) References Cited

OTHER PUBLICATIONS

Hennessy, John L., et al. Computer Architecture: A Quantitative Approach, 2003, Elsevier Science & Technology, 3rd Edition, pp. 609-611. Retrieved from ProQuest Ebook Central (2014). (Year: 2014).*
M. Mead and C. Conway, "Introduction to VLSI systems," 1980. (Year: 1980).*
B.Ravina et al., "An Efficient Multiplier Design with Dadda Algorithm using OFA," SRG International Journal of Electronics and Communication Engineering (SSRG_IJECE), Sep. 2018, 4 Pages.
D. Kumar T, et al., "ASIC Implementation of DADDA Multiplier." International Journal of Engineering Research & Technology (IJERT), Jul. 2019, 5 Pages.
S. Ravi, et al., "Low Power and Efficient Dadda Multiplier," Maxwell Scientific Publication Corp., Jan. 5, 2015, 5 Pages.
S. V.P et al., "Approximate Multiplier by Partial Product Preforation," International Journal of Advanced Research in Computer and Communication Engineering, May 2017, 7 Pages.
S.Mamatha, "Low Power DADDA Multiplier Design using Adaptive Hold Logic for Canny Edge Detection," International Journal of Advanced Research in Electrical, Electronics and Instrumentation Engineering, Nov. 2017, 18 Pages.

* cited by examiner

DADDA ARCHITECTURE THAT SCALES WITH INCREASING OPERAND SIZE

BACKGROUND

The present invention generally relates to computer systems, and more specifically, to computer systems, computer-implemented methods, and computer program products implementing physical design-optimal Dadda architectures that scale with increasing operand size.

Integer operations such as addition and multiplication are some of the basic building blocks of a computing system. A binary multiplier is an electronic circuit used in digital electronics, such as a computer, to multiply two binary numbers. Multipliers are built using binary adders. Wide integer multipliers are a type of multiplier that is suitable to handling large operands, and are crucial to many applications areas, such as, for example, numerical processing, cryptography, image processing, and digital signal processing (DSP). Wide integer multipliers also serve as the foundation of floating-point arithmetic for high precision computing.

One requirement in building wide integer multipliers is deciding how to handle the accumulation of partial products. Two widely used methods to efficiently handle partial products for large operands are based on the Wallace-tree and the Dadda-tree. These methods leverage various column compression techniques that allow us to construct tree adders to accumulate the partial products, hence reducing the required gate count and critical path delay. Despite many advancements in the implementation of Wallace-based and Dadda-based strategies, the area requirements and performance numbers of these arithmetic operations remain a bottleneck which only worsens as the operand size increases.

SUMMARY

Embodiments of the present invention are directed to physical design-optimal Dadda architectures that scale with increasing operand size. A non-limiting example method includes generating a partial product array for two n-bit operands and shifting columns in the partial product array to a first row. The number of partial products in each column can be iteratively reduced across one or more stages until each column has at most two partial products. At each stage a maximum column height is determined and each column having a height greater than the maximum column height is reduced using half-adders and full-adders. Result bits of the half-adders and the full-adders are placed at the bottom of the current column and carry bits of the half-adders and the full-adders are placed at the bottom of the next column.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
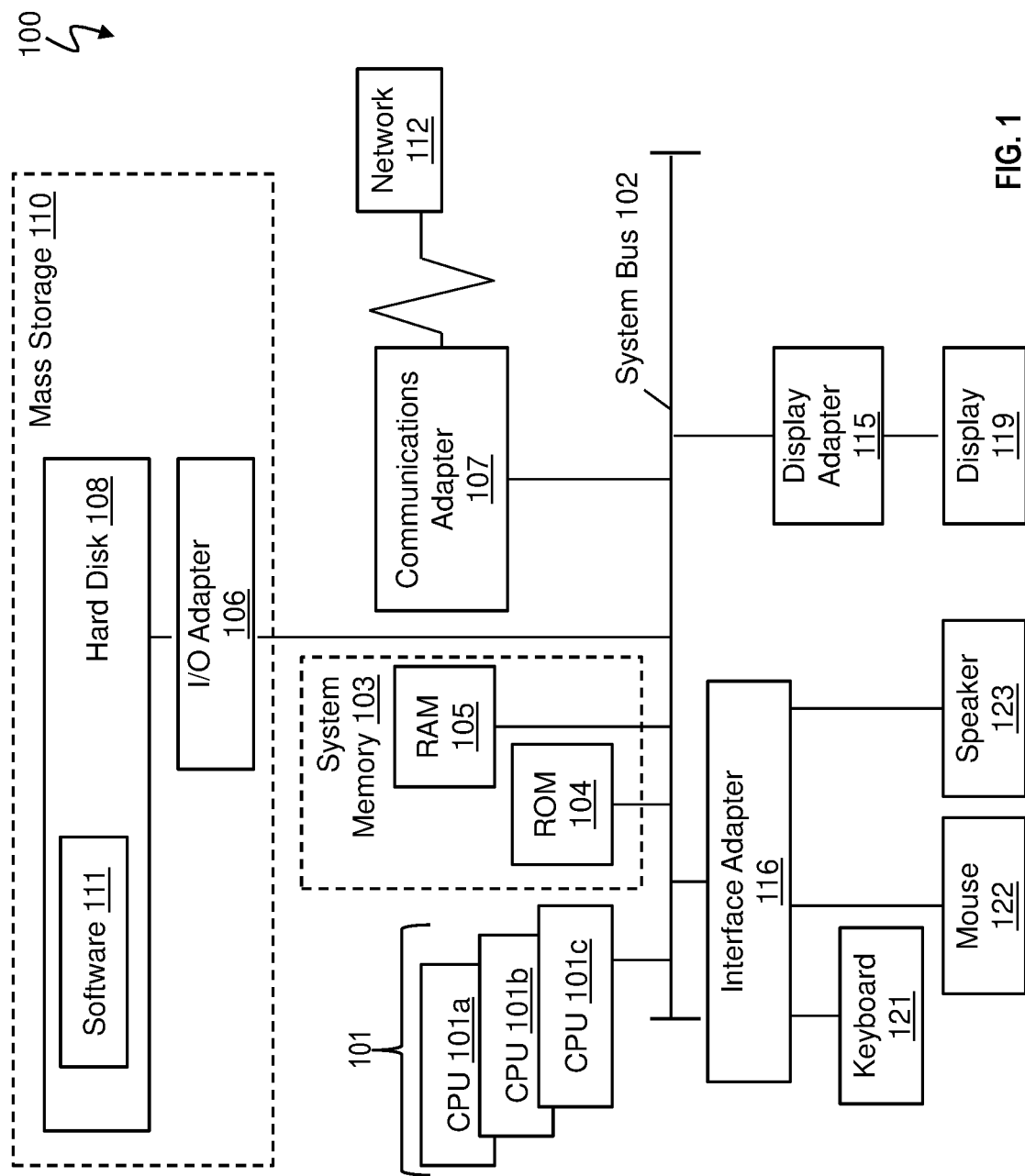
FIG. 1 depicts a block diagram of an example computer system for use in conjunction with one or more embodiments of the present invention.

Wide integer multiplication is one of the most basic functions of a computing system. A challenge in building wide integer multipliers is the accumulation of partial products, and while the Wallace-tree and the Dadda-tree have been shown to be somewhat efficient in handling this task, each is limited by the clock cycle of the underlying computing device. This clock cycle limitation forces an immediate practical constraint on these architectures; namely, that as the size of the operands increase, there comes a point where partial product reduction cannot be completed in a single clock cycle due to the size of combinatorial logic. This forces Wallace and Dadda-based multiplier designs to use a pipelined approach with multiple latches that reduce the number of partial products (i.e., tree reduction).

Wallace-tree and Dadda multipliers reduce the partial products tree in stages. In each stage, some elements are added and the sum and carry are processed in the next stage with other remaining elements. A Wallace tree, for example, reduces the number of partial products to two layers of full and half adders. Unlike Wallace multipliers that reduce as much as possible on each layer, Dadda multipliers attempt to minimize the number of gates used, as well as input/output delay. Because of this, Dadda multipliers have a less expensive reduction phase, but the final numbers may be a few bits longer, thus requiring slightly bigger adders.

In both Wallace and Dadda-based multipliers the carry bits from one stage are placed in the immediate next stage. Consequently, in either case the combinatorial delay in the first stage will be significantly higher than the other stages. As a practical matter, this means that a latch stage is always required after the first stage. For very large multipliers greater than 64-bit, it is possible that the first stage itself may have more combinatorial delay than the clock cycle. For a 128-bit multiplier, the delay is already on the order of 1000 nanoseconds (ns) with 7 nanometer (nm) technology, making 128+ bit multipliers require expensive intra-stage latches to meet timing requirements.

One or more embodiments of the present invention address one or more of the above-described shortcomings by providing computer-implemented methods, computing systems, and computer program products for implementing physical design-optimal Dadda architectures that scale with increasing operand size. Embodiments of the present invention describe a new kind of approach for implementing wide integer multipliers—one that inserts the carry and sum bits at the bottom of their respective columns rather than at the top. This means that, unlike traditional tree reduction schemes where the carry and sum bits are processed in the immediately following stage, one or more embodiments of the present invention delay the processing of a carry bit (and sum bit) from one stage by as many stages as possible. This type of processing can be referred to as as-late-as-possible (ALAP) scheduling. Using ALAP scheduling, the other bits (non-carry, non-sum bits) are processed earlier by rotating the column of bits. Processing carry and sum bits in this manner increases the length of wires for routing but spreads the combinatorial logic evenly across all stages. This allows one or more embodiments of the present invention to pipeline the multiplier at any stage (as per critical path) by evenly spreading the delay across stages.

Advantageously, a wide integer multiplier implemented according to one or more embodiments offers several technical solutions and benefits over conventional multiplier architectures. For one, these unique features make 128-bit, 256-bit, or even larger bit-width multipliers easily synthesizable without causing the first stage to have more combinatorial delay than the clock cycle (i.e., a first stage delay spike). Instead, the combinatorial delay is the same across all stages. In some embodiments of the invention, a 128-bit multiplier design is synthesizable with 7 nm technology, timed at 168 picoseconds with a latch after 4 stages. This far exceeds the delay performance (approx. 1000 ns at 7 nm node) of current 128+ bit multipliers using intra-stage latches to meet timing requirements. Moreover, the frequency of the respective system clock and the location of the pipelining latches can be varied as per the technology and design requirements, limited only by the evenly spread combinatorial delay of each stage (rather than the delay due to a slowest stage, typically the first stage, in conventional systems having unevenly spread combinatorial delays).

Gate distribution is greatly improved, as the first stage of the tree reduction in traditional multipliers has the maximum number of cascaded gates, while in multipliers constructed according to one or more embodiments the number of cascaded gates in all stages is the same. As a result, gate distribution in traditional multipliers is non-uniform and heavily skewed towards the middle of the partial product tree. This results in higher congestion, albeit at a slightly lower area requirement. Conversely, a more distributed gate placement with increased gate count towards the ends of the partial product tree, while still non-uniform, results in a slightly higher area requirement (i.e., the cost), but less congestion (i.e., the benefit).

Latch reduction is also possible. In traditional multipliers the first few stages contribute heavily to combinatorial delay. This uneven contribution results in inefficiencies, for example, multiplying two 128-digit numbers with 7 nm technology requires 6 latch stages. Evenly distributed combinatorial delay provided by delaying carry and sum bit processing according to one or more embodiments results in optimal latching. Continuing from the prior example, multiplying two 128-digit numbers with 7 nm technology only requires 5 latch stages (1 latch reduction).

One or more embodiments of the present invention can also provide increased implementation efficiencies. For example, rather than using a "sequential" propagation of carry from one end of the partial products to the other end (as in current multiplier architectures), the present invention allows for a single bit propagation of carry per stage. In other words, the entire chain propagation happens over multiple stages. In addition, while current architectures can require intra-latch stages, especially for the first few stages to meet timing requirements (dependent on clock and operand width), only inter-latch stages needed.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 5 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
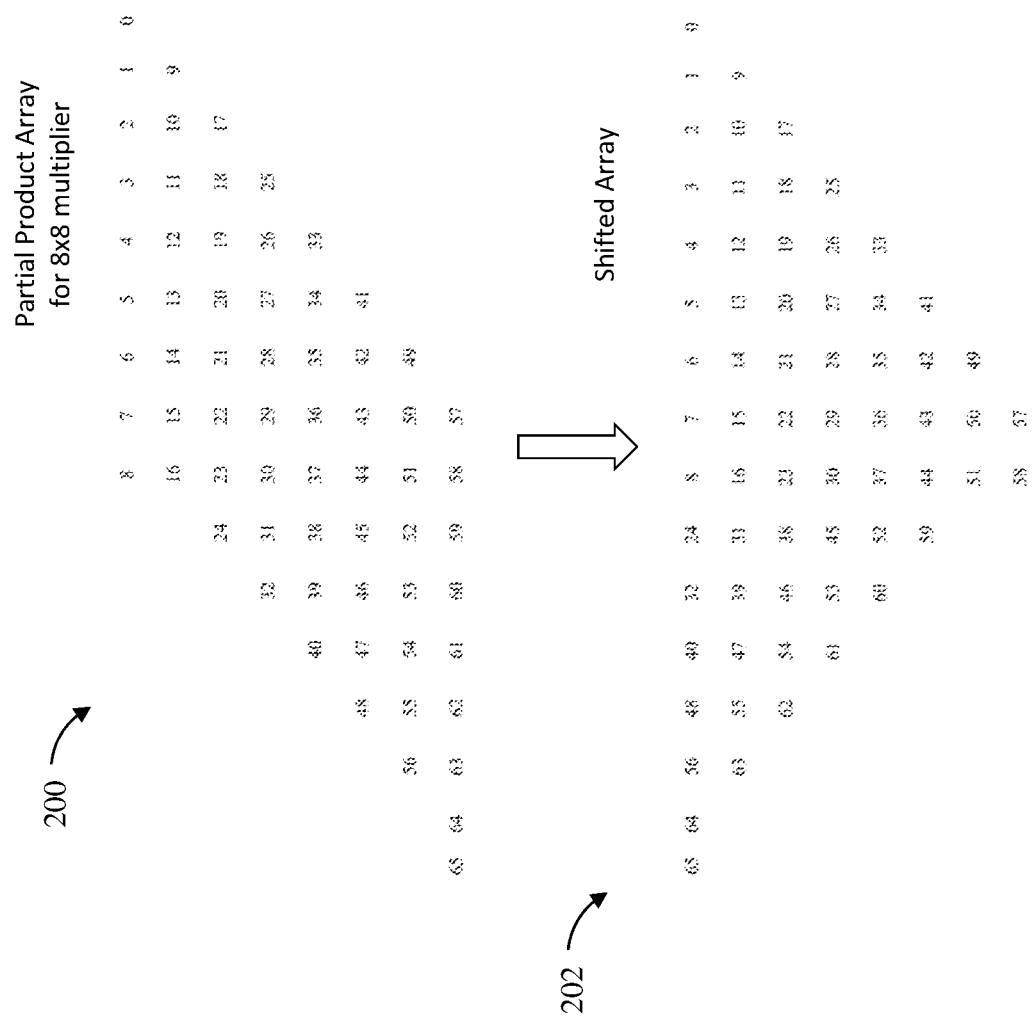
FIG. 2 depicts a partial product array diagram and a shifted array constructed in accordance with one or more embodiments of the present invention.

FIG. 2 illustrates a partial product array diagram 200 for an 8*8 multiplier and a shifted array 202, each constructed in accordance with one or more embodiments of the present invention. To construct the partial product array diagram 200, consider two n-bit operands $a_{n-1}a_{n-2} \ldots a_1a_0$ and $b_{m-1}b_{m-2} \ldots b_1b_0$ for an n by m multiplier where n=8 and m=8. The partial products of two n-bit numbers are $a_ib_j$ where "i" and "j" go from 0 to n−1 (e.g., 0, 1, 2, 3, 4, 5, 6, 7). While an 8*8 multiplier is shown for ease of discussion, it is understood that embodiments of the present invention can be implemented for arbitrary N*M multipliers.

The partial products generally form a matrix of n rows and 2n−1 columns (with some flexibility for additional carry bits, such as the final carry bit labeled "65"), as shown in FIG. 2. To each partial product we assign an index number for ease of reference, for example, the partial product $a_0b_0$ is given an index "0", $a_1b_0$ the index "1", and so on. In some embodiments of the invention, the indices in the partial product array diagram 200 are shifted "up" as far as possible (i.e., each column is shifted until it reaches the first row). The resultant shifted array 202 defines a triagonal structure where the longest columns are found in the middle of the partial products (i.e., at those points where all or nearly all rows contribute to column depth). It is these longest columns that contribute to the maximum delay in a partial product summation tree (PPST) used in Dadda-based partial product computations.

Figure 3:
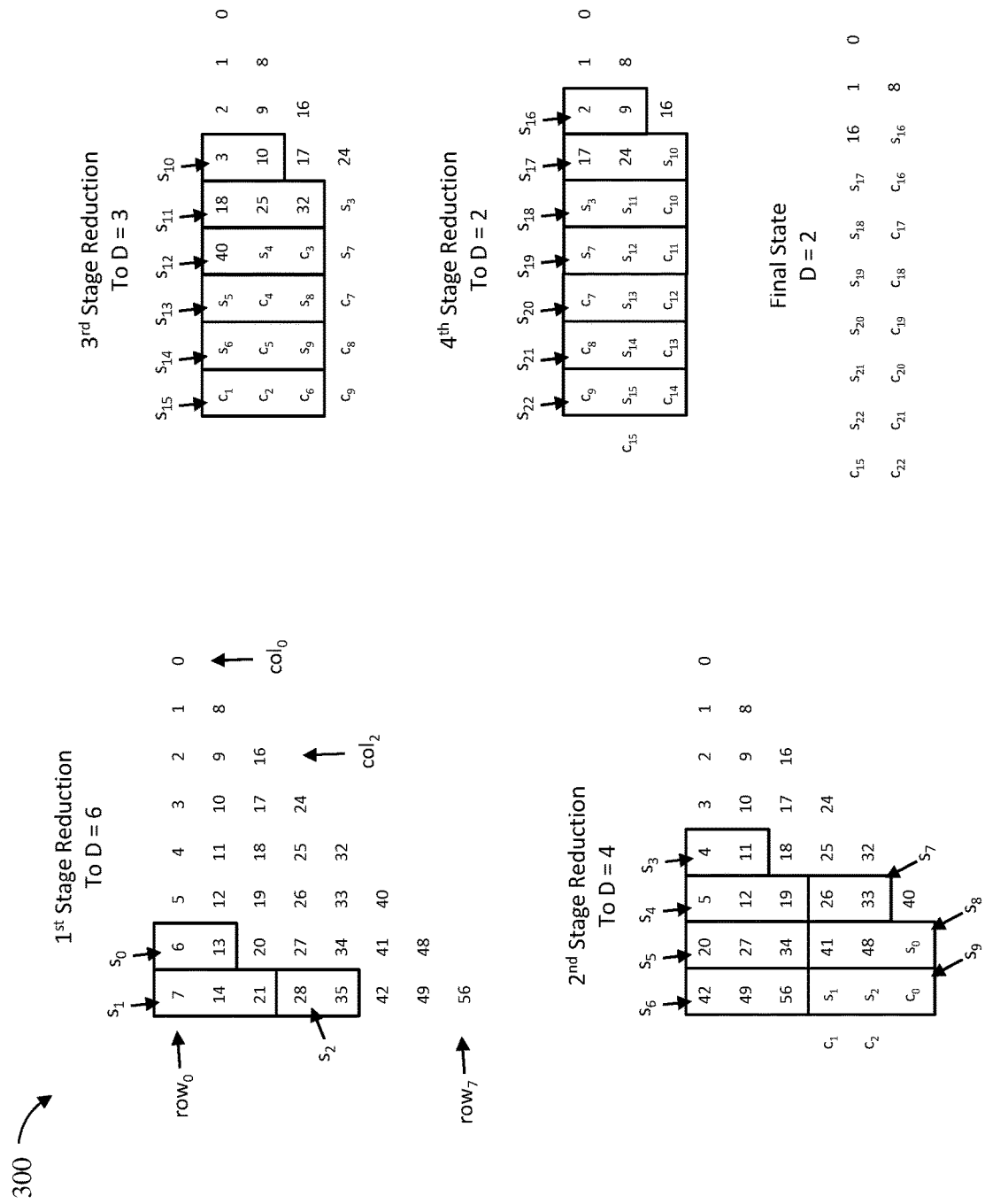
FIG. 3 depicts a modified Dadda-based reduction scheme in accordance with one or more embodiments of the present invention.

In some embodiments of the invention, once a shifted array is generated, a modified Dadda-based reduction scheme 300 is implemented to successively (over stages) reduce the number of partial products (array elements) in each column until we are left with at most two elements in each column (i.e., 2 bits per column), as shown in FIG. 3. While the reduction scheme 300 is shown with reference to only a portion of a shifted array (e.g., the shifted array 202 shown in FIG. 2) to simplify the discussion, it is understood that the reduction scheme 300 can be similarly applied to a full shifted array or to arbitrarily segmented shifted arrays.

In some embodiments of the invention, progression of the reduction process at each stage is controlled by a maximum-height sequence, defined by: $d_1=2$ and $d_{j+1}=\text{floor}(1.5d_j)$, which yields the sequence $d_1=2$, $d_2=3$, $d_3=4$, $d_4=6$, $d_5=9$, $d_6=13$, and so on. In some embodiments of the invention, the initial value of "j" is chosen as the largest value such that $d_j<\min(n_1, n_2)$, where $n_1$ and $n_2$ are the number of bits in the input multiplicand and multiplier, respectively. Continuing with the prior example, for an 8*8 multiplier the initial value of "j" is 4, corresponding to $d_4=6$, as 6 is the largest value in the maximum-height sequence that is less than 8. In another example, "j" is 5 for a 10*14 multiplier (where $d_5=9$ is the largest number in the sequence that is less than 10).

The lesser of the two bit lengths $n_1$ and $n_2$ defines the maximum height of each column of weights in the shifted array after the first stage of multiplication (i.e., the maximum column height prior to any reduction stages). For the first stage of reduction, the goal of the algorithm is the reduce the height of each column so that it is less than or equal to the initial value of $d_j$. For example, for the first reduction stage of an 8*8 multiplier (having an initial max column height of 8) the goal is to reduce the height of each column to less than or equal to 6 (e.g., $d_4=6$). Thereafter, for each successive stage of the reduction, the goal of the algorithm is the reduce the height of each column so that it is less than or equal to the next value of $d_j$. For example, for the second reduction stage of an 8*8 multiplier (which now has a max column height of 6) the goal is to reduce the height of each column to less than or equal to 4, corresponding to the next value in the maximum-height sequence (e.g., $d_3=4$). This process continues arbitrarily for any number of stages until the maximum column height is 2 (i.e., where $d_1=2$, or simply, D=2, as shown in the Final State of FIG. 3).

In some embodiments of the invention, reducing the number of partial products in a given row (as required per the maximum-height sequence) is achieved according to predefined rules. In some embodiments of the invention, for each stage, reduce each column starting at the lowest-weight column (right-most column, $col_0$), as follows: First, determine the height of the column, height($col_i$), including any carry bits ($c_{i-1}$) from the previous column (explained in greater detail below). Next, (1) If height($col_i$)≤$d_j$, the column does not require reduction, move to column $col_{i+1}$; (2) If height($col_i$)=$j_j$+1, add the top two elements in a half-adder and place a carry into the next column ($c_{i+1}$); and (3) Else (height($col_i$)>$j_j$+1), add the top three elements in a full-adder, place a carry into the next column ($c_{i+1}$), and re-evaluate the column with the top three elements considered as a single element (the result or sum bit, $s_i$).

For example, consider the $1^{st}$ stage reduction shown in FIG. 3. For an 8*8 multiplier, initial state j=4 and $d_4$=6 (6 is the largest value less than 8 in the maximum-height sequence). The height of columns $col_0$ to $col_5$ are all less than or equal to six bits in height, so no changes are made. Height($col_6$)=7=$d_4$+1, so a half-adder is applied ($s_0$=6+13), reducing $col_6$ to six bits and a carry bit ($c_0$) is added to the next column. Height($col_7$)=9 including the carry bit from $col_6$, so a full-adder is applied ($s_1$=7+14+21), a carry bit ($c_1$) is added to the next column, and $col_7$ is re-evaluated. During the re-evaluation, height($col_7$)=7 (remember, elements 7, 14, and 21 only count as a single sum bit, $s_1$), so a half-adder is applied ($s_2$=28+35) to reduce the height to six bits and a carry ($c_2$) is placed in the next column. Note that $c_1$ and $c_2$ can be placed to the left of the left-most column in the $1^{st}$ stage reduction. The result is simply to create a new column in the following stage, as shown in the $2^{nd}$ stage reduction of FIG. 3. This column reduction process continues across all columns until no further height reductions are needed. At that point, the stage (e.g., j=4, $d_4$=6) is incremented and the process starts over with $col_0$ and the new value for $d_{j-1}$ (here, $d_3$=4). This process repeats until all columns have a height of 1 or 2, corresponding to the final state where d=2.

In some embodiments of the invention, results of the half-adders and full-adders are placed at the bottom of the current column, and carries of the half-adders and full-adders are placed at the bottom of next column, as shown in FIG. 3. For example, the half-adder result $s_0$=6+13 is placed at the end of its respective column ($col_7$) and the carry $c_0$ is placed at the end of the next column ($col_8$). In some embodiments of the invention, all results and carries are determined concurrently (in parallel), and all result bits are placed at the bottom of their designated columns prior to placing the carry bits. This is shown in the $2^{nd}$ stage reduction of FIG. 3, where the carry bit $c_0$ is placed below the result bits $s_1$ and $s_2$.

In some embodiments of the invention, the other partial products in the column are rotated (shifted) up to replace the results of the half-adders and full-adders (which have been moved to the bottom of their destination columns as discussed). For example, the partial products 20, 27, 34, 41, 48 are moved above the result bit so as illustrated in the $2^{nd}$ stage reduction of FIG. 2.

Placing the result and carry bits at the bottom of their respective columns results in delaying the processing of those bits by as many stages as possible. For example, the result bit $s_3$ calculated during the $2^{nd}$ stage reduction is placed at the bottom of $col_5$ and, consequently, avoids combinatorial logic during the $3^{rd}$ stage reduction (i.e., $s_3$ passes the $3^{rd}$ stage without being incorporated into a full or half adder). Instead of processing $s_3$ in an adder, other bits (18, 25, 32, etc.) are processed by rotating the column of bits. Processing carry and sum bits in this manner increases the length of wires for routing but spreads the combinatorial logic evenly across all stages, as discussed previously.

Figure 4:
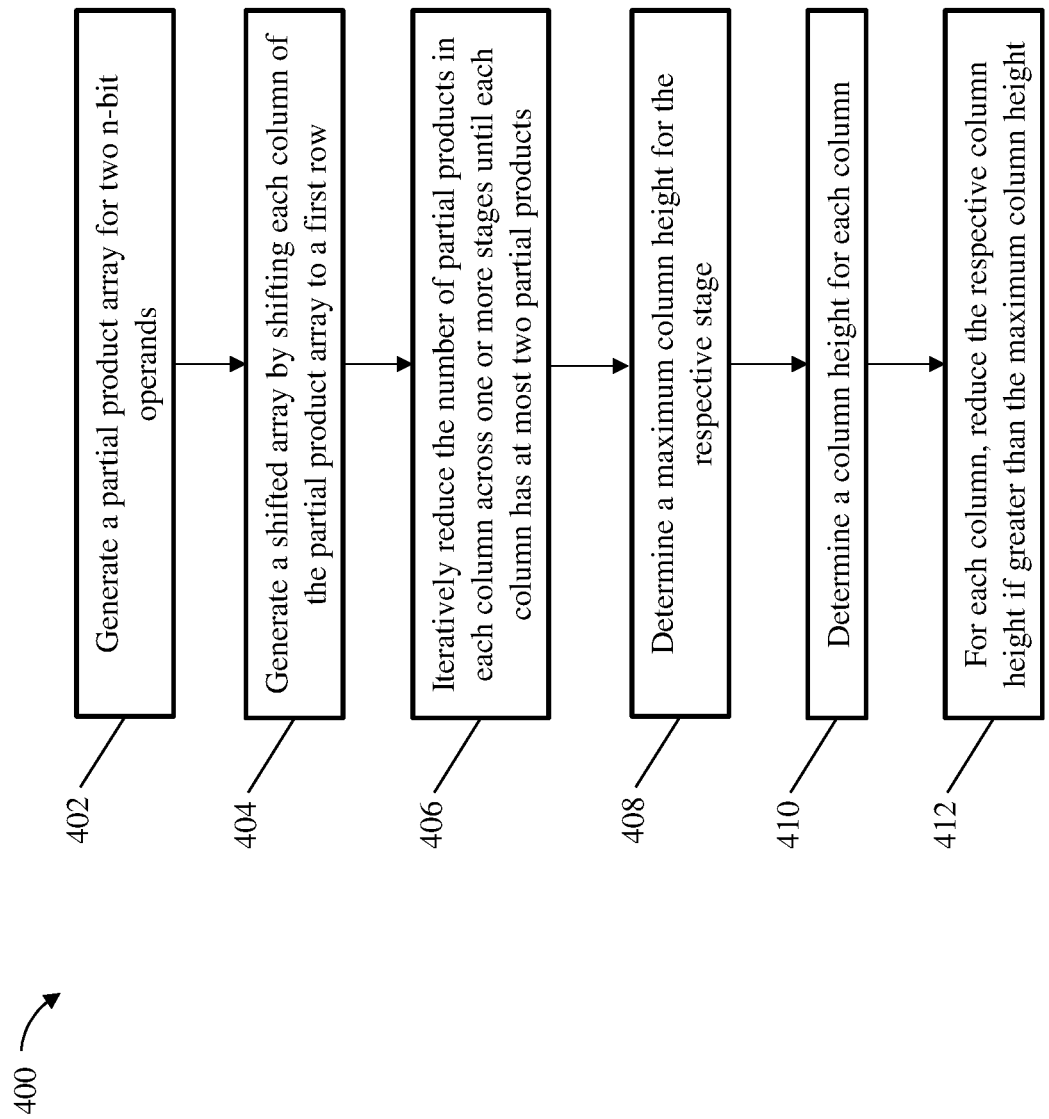
FIG. 4 is a flowchart in accordance with one or more embodiments of the present invention.

Referring now to FIG. 4, a flowchart 400 for implementing physical design-optimal Dadda architectures that scale with increasing operand size is generally shown according to an embodiment. The flowchart 400 is described in reference to FIGS. 1-3 and may include additional steps not depicted in FIG. 4. Although depicted in a particular order, the blocks depicted in FIG. 4 can be rearranged, subdivided, and/or combined. Moreover, the flowchart 400 described in reference to FIGS. 1-3 can be implemented as one or more components or modules of an n-bit multiplier. In some embodiments of the invention, the n-bit multiplier is an 8, 16, 32, 64, 128, or 256-bit multiplier, although wider bit widths are within the contemplated scope of the invention.

At block 402, a system configured for implementing a physical design-optimal Dadda architecture (e.g., the computer system 100 and/or internal device logic) generates a partial product array for two n-bit operands. The partial product array can include a plurality of partial products and each partial product can corresponds to a unique row-column pair of the partial product array. At block 404, the system generates a shifted array by shifting each column of the partial product array to a first row.

At block 406, the system iteratively reduces the number of partial products in each column across one or more stages until each column has at most two partial products. In some embodiments of the invention, each stage includes block 408, where a maximum column height is determined for the respective stage. In some embodiments of the invention, each stage includes block 410, where the system determines a column height for each column. In some embodiments of the invention, each stage includes block 412, where, for each column, the system reduces the respective column height if greater than the maximum column height. In some embodiments of the invention, reducing the respective column height includes adding partial products in one or more adders. In some embodiments of the invention, reducing the respective column height includes at least one of adding two partial products in a half-adder and adding three partial products in a full-adder.

In some embodiments of the invention, result bits of the half-adders and the full-adders are placed at the bottom of the current column. In some embodiments of the invention, carry bits of the half-adders and the full-adders are placed at the bottom of the next column. In this manner, processing carry bits and result bits in a stage is delayed by as many stages as possible. In some embodiments of the invention, all result bits and all carry bits are determined in parallel. In some embodiments of the invention, all result bits are placed at the bottom of their respective columns prior to placing the carry bits.

The method can further include adding one or more carry bits from a previous column to the current column. In some embodiments of the invention, the maximum column height is defined according to a maximum-height sequence. The maximum-height sequence includes an initial value (e.g., 2) and one or more following values. In s the following values can be equal to one and a half times the previous value rounded down.

In some embodiments of the invention, reducing each respective column height further includes, in response to the column height being one greater than the maximum column height, adding two partial products in a half-adder and placing a carry bit into the next column. In some embodiments of the invention, reducing each respective column height further includes, in response to the column height being two or more greater than the maximum column height, adding three partial products in a full-adder, placing a carry bit into the next column, and re-evaluating the current column with the three added partial products considered as a single partial product.

Once all columns have at most two partial products, embodiments of the invention can include passing the 2 element columns to a final adder (not shown) and computing the final product. The final adder can be incorporated within the n-bit multiplier.

In some embodiments of the invention, the final product is used by an application (e.g., an application of the computer system 100 shown in FIG. 1) to generate an output. The output can vary depending upon the specific application, for example, computing large number multiplications is required in various cryptographic and signal processing applications. A signal processing application can include, for example, image multiplication, where two input images are converted to a single output image in which the pixel values are combinations of the first image pixel values, multiplied by the pixel values of the corresponding pixels in the second image. A second type of image processing, known as scaling, takes a single input image and produces an output in which each pixel value is multiplied by a predetermined constant. In some embodiments of the invention, the output of the final product is used to generate an image.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
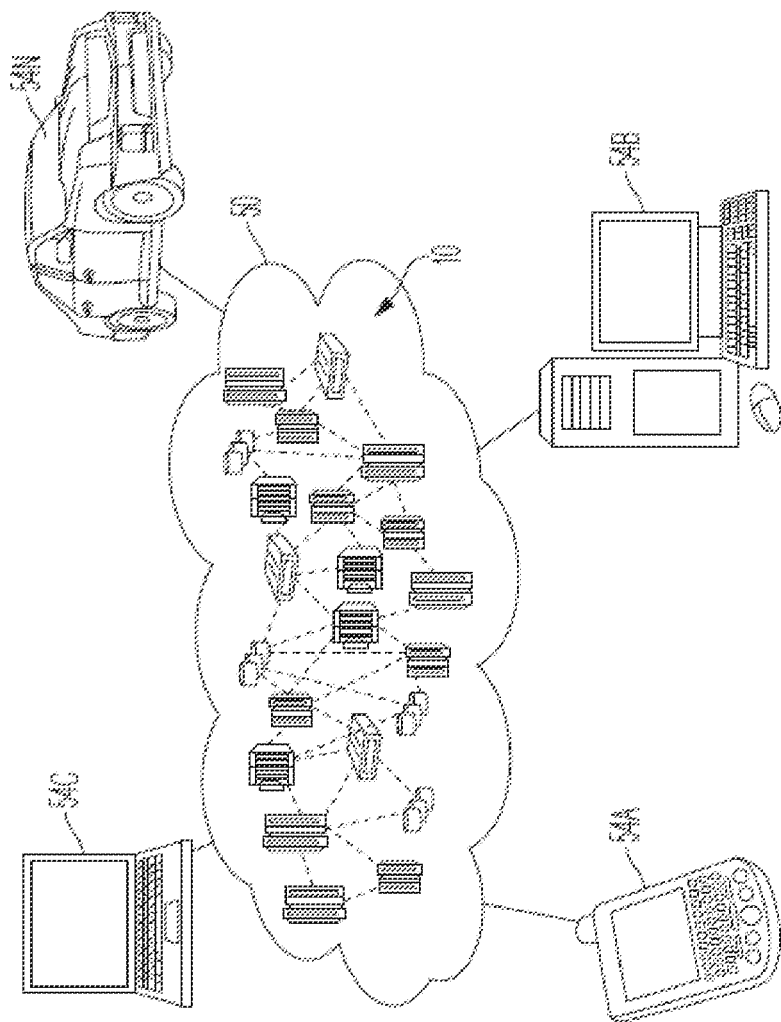
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
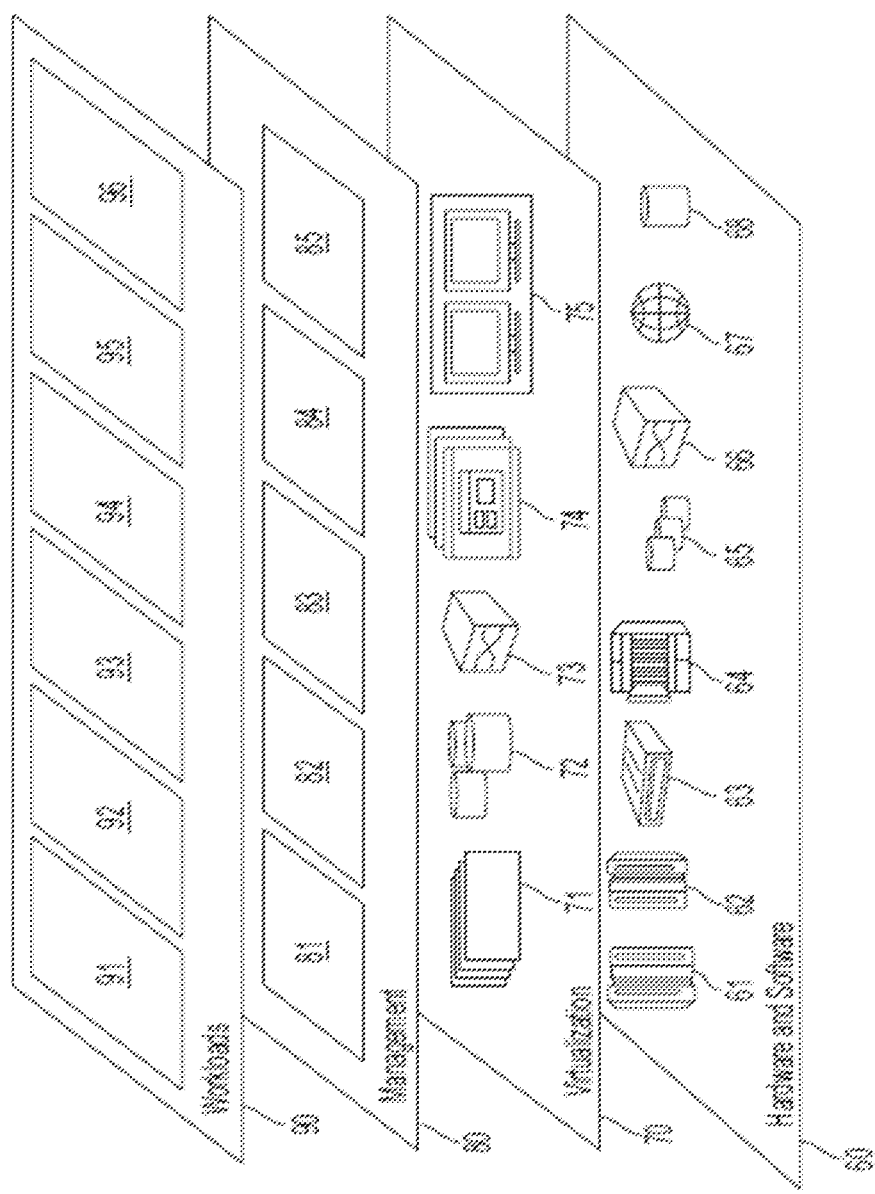
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A wide integer multiplier for as-late-as-possible (ALAP) scheduling of carry bits and sum bits, the wide integer multiplier comprising:
    hardware-implemented digital logic circuitry comprising wires routed such that combinatorial logic of the wide integer multiplier is distributed evenly across all stages of a Dadda architecture and carry and sum bits are inserted at a bottom of a respective column of the Dadda architecture;
    a plurality of cascaded gates, wherein a number of cascaded gates in all stages of the Dadda architecture is the same; and
    wherein the wide integer multiplier is configured to:
        generate a partial product array for two n-bit operands, the partial product array comprising a plurality of partial products, wherein each partial product corresponds to a row and a column of the partial product array;
        generate a shifted array by shifting each column of the partial product array to a first row; and
        iteratively reduce the number of partial products in each column across one or more stages until each column has at most two partial products, wherein each stage comprises:
            determining a maximum column height for the respective stage;
            determining a column height for each column; and
            for each column, reducing the respective column height in response to the respective column height being greater than the maximum column height, wherein reducing the respective column height comprises adding partial products in one or more adders of the wide integer multiplier, wherein result bits of the one or more adders are placed at the bottom of the current column, and wherein carry bits of the one or more adders are placed at the bottom of the next column.

2. The wide integer multiplier of claim 1, wherein determining the column height for each column comprises adding one or more carry bits from a previous column to the current column.

3. The wide integer multiplier of claim 1, wherein the maximum column height is defined according to a maximum-height sequence comprising an initial value equal to 2, and wherein following values are equal to one and a half times the respective immediately preceding value rounded down.

4. The wide integer multiplier of claim 1, wherein reducing each respective column height further comprises:
    in response to the respective column height being one greater than the maximum column height, adding two partial products in a half-adder and placing a carry bit into the next column; and
    in response to the respective column height being two or more greater than the maximum column height, adding three partial products in a full-adder, placing a carry bit into the next column, and re-evaluating the current column with the three added partial products considered as a single partial product.

5. The wide integer multiplier of claim 1, wherein reducing the respective column height comprises one or both of adding two partial products in a half-adder and adding three partial products in a full-adder.

6. The wide integer multiplier of claim 1, wherein all result bits and all carry bits are determined in parallel.

7. The wide integer multiplier of claim 1, wherein all result bits are placed at the bottom of their respective columns prior to placing the carry bits of the one or more adders.

* * * * *